United States Patent
Norton

(10) Patent No.: US 9,252,466 B2
(45) Date of Patent: Feb. 2, 2016

(54) BATTERY PACK ASSEMBLY

(75) Inventor: Kenneth Hamilton Norton, Guangdong (CN)

(73) Assignee: CHEEVC LTD., Fife (GB)

(*) Notice: Subject to any disclaimer, the term of this patent is extended or adjusted under 35 U.S.C. 154(b) by 371 days.

(21) Appl. No.: 13/884,217

(22) PCT Filed: Nov. 25, 2010

(86) PCT No.: PCT/CN2010/079121
§ 371 (c)(1),
(2), (4) Date: May 8, 2013

(87) PCT Pub. No.: WO2012/068732
PCT Pub. Date: May 31, 2012

(65) Prior Publication Data
US 2013/0236745 A1 Sep. 12, 2013

(51) Int. Cl.
| | |
|---|---|
| *H01M 2/10* | (2006.01) |
| *H01M 10/613* | (2014.01) |
| *H01M 2/20* | (2006.01) |
| *H01M 10/42* | (2006.01) |
| *H01M 10/6555* | (2014.01) |
| *H01M 10/617* | (2014.01) |
| *H01M 10/659* | (2014.01) |

(52) U.S. Cl.
CPC ........ *H01M 10/5004* (2013.01); *H01M 2/1077* (2013.01); *H01M 2/206* (2013.01); *H01M 10/425* (2013.01); *H01M 10/613* (2015.04); *H01M 10/617* (2015.04); *H01M 10/659* (2015.04); *H01M 10/6555* (2015.04)

(58) Field of Classification Search
None
See application file for complete search history.

(56) References Cited

U.S. PATENT DOCUMENTS

| | | | | |
|---|---|---|---|---|
| 5,585,204 A | * | 12/1996 | Oshida et al. | 429/62 |
| 2005/0110458 A1 | * | 5/2005 | Seman et al. | 320/114 |
| 2007/0231687 A1 | * | 10/2007 | Kim et al. | 429/208 |

FOREIGN PATENT DOCUMENTS

| | | |
|---|---|---|
| CN | 101237033 A | 8/2008 |
| CN | 101237033 A | 8/2008 |
| CN | 101308938 A | 11/2008 |

(Continued)

OTHER PUBLICATIONS

Dong et al. CN 101308938 Machine translation (Nov. 19, 2008).*
International Search Report for PCT/CN2010/079121 mailed Aug. 25, 2011.

(Continued)

*Primary Examiner* — Carlos Barcena
*Assistant Examiner* — Wojciech Haske
(74) *Attorney, Agent, or Firm* — Dorsey & Whitney LLP

(57) ABSTRACT

A battery pack assembly allowing automated single ended bonding directly between a battery cell and a Printed Circuit Board (PCB) is disclosed. The pack assembly comprises: a caddy, soft and malleable pad, plastic cell lattice, PCB, and plurality of ultrasonic wire or ribbon bonds. The pad includes a first group of apertures and is set on the top of battery cells. The cell lattice includes a second group of apertures and is set on the top of the pad. The PCB includes a third group of apertures and is set on the top of the cell lattice. The ultrasonic wire or ribbon bonds directly connect positive and negative contacts of the battery cells with the PCB. A battery pack assembly allowing equalizing of the temperature potentials of every battery cell in the pack is also disclosed. The pack assembly comprises: a phase change material, soft and malleable pad, and caddy.

5 Claims, 4 Drawing Sheets

(56) References Cited

FOREIGN PATENT DOCUMENTS

| | | | |
|---|---|---|---|
| CN | 101308938 | A | 11/2008 |
| CN | 101546843 | A | 9/2009 |
| CN | 101546843 | A | 9/2009 |
| CN | 101635382 | A | 1/2010 |
| JP | 2001-6644 | A | 1/2001 |
| JP | 2001-6644 | A | 1/2001 |
| WO | 2006082425 | A1 | 10/2006 |
| WO | 2010001090 | A2 | 1/2010 |

OTHER PUBLICATIONS

International Written Opinion for PCT/CN2010/079121 mailed Aug. 25, 2011.

The State Intellectual Property Office, The P.R. China, International Search Report for PCT/CN2010/079121, dated Aug. 25, 2011, 5 pages.

The State Intellectual Property Office, The P.R. China, International Written Opinion for PCT/CN2010/079121, dated Aug. 25, 2011, 5 pages.

\* cited by examiner

BATTERY PACK ASSEMBLY

CROSS-REFERENCE TO RELATED APPLICATION(S)

The present application relates to and claims priority from International Patent Application No. PCT/CN2010/079121 filed Nov. 25, 2010. The entire disclosure of the above-identified application is hereby incorporated by reference in its entirety.

FIELD OF THE INVENTION

The present invention relates to the field of improving the reliability and extending the performance of Lithium battery packs in general, and particularly to battery pack assembly techniques appropriate to light electric vehicles.

BACKGROUND OF THE INVENTION

One known issue with Dynamic or Active Battery Cell Balancing is that its effectiveness is compromised by variations in temperature across the pack. Battery cell temperatures vary due to differences in individual chemical compositions and internal resistances. If the individual state of charge (SOC) estimation is not made at the same thermal potential then the charge balancing system is not able to make accurate judgments on the need to transfer charge.

If the pack is assembled with a technical grade wax jacket surrounding each battery cell then the temperature can be equalized to be homogenous across the pack. The wax acts as a phase change material, rapidly melting at a relatively low temperature and thus able to transfer heat by natural convection between the battery cells.

A weakness and source of premature failure in current multi-cell battery packs is the tab bonding used to interconnect the battery cells. The tabs are spot-welded in a process which injects heat locally, an undesirable action which promotes premature failure. Furthermore the bonds have variable impedances which affect both the absolute performance of the pack and the effectiveness of the battery management systems.

Alternatively if a wiring harness is employed for interconnect and battery management purposes, this too is a source of potential failure by adding a multiplicity of connection nodes of varying impedance and each with the potential for outright failure or compromising the effectiveness of the battery management system. Wiring harnesses add cost and complexity and are subject to the same quality issues affecting any manually intensive process.

Ultrasonic wire or ribbon bonding is a technique used successfully in the semiconductor industry over a wide range of products including high power devices capable of handling similar currents to those found in light electric vehicle applications. By targeting this technology at the battery pack a high degree of automation is possible and a consequent improvement in reliability can be demonstrated. Connection points to the battery cells need to be migrated to a single end for ease of access and assembly.

SUMMARY OF THE INVENTION

It is an object of the invention to improve and extend the performance and feature set of a battery pack system.

It is another object of the invention to improve the reliability of the system by automated assembly techniques and removal of unreliable wire loom based interconnect systems generally used for power distribution and cell monitoring.

In a first aspect of the present invention, there is provided a battery pack assembly, which allows automated single ended bonding directly between a battery cell and a Printed Circuit Board, comprising:

a caddy for retaining battery cells;

a soft and malleable pad having a first group of apertures, and being set on the top of battery cells;

a plastic cell lattice having a second group of apertures, and being set on the top of the soft and malleable pad;

the Printed Circuit Board (PCB) having a third group of apertures, and being set on the top of the plastic cell lattice; and a plurality ultrasonic wire or ribbon bonds directly connecting positive contacts and negative contacts of the battery cells with the Printed Circuit Board.

Optionally, the caddy includes a lid for sealing the caddy.

Optionally, the Printed. Circuit Board is suitably featured to be mounted on the caddy.

Optionally, the first group of apertures, the second group of apertures and the third group of apertures are corresponding to the battery cells, thus leaving positive contacts and negative contacts of the battery cells approximately in a same vertical plane as an upper surface of the PCB.

Optionally, the soft and malleable pad is a rubber membrane.

Consequently the battery cells can be connected directly to the PCB using an automated method such as ribbon bonding, wire bonding or any similar process not involving a high temperature weld. The bonding process will preferably be ultrasonic so that no additional heat is imparted to the battery cells which could be the cause of stress and premature failure. Similarly this direct bonding removes the requirement for a traditional wiring harness and the associated reliability issues due to high impedance connections.

In a second aspect of the present invention, there is provided a battery pack assembly, which allows equalizing the temperature potentials of every battery cell in the battery pack assembly, comprising: a phase change material, a soft and malleable pad and a caddy. The phase change material keeps the battery pack within a safe operating temperature and equalizing the temperature homogenous across the pack. The soft and malleable pad is set on the top of battery cells for compensating for a change in volume as the phase change material changes from solid to liquid phases and vice versa. The caddy retains the battery cells, the phase change material and the soft and malleable pad.

Optionally, the phase change material absorbs significant amounts of latent heat energy at a constant temperature, and when the temperature reduces in periods of inactivity of the battery cells the phase change material solidifies, thus slowly releasing its stored latent heat back to the cells. This is particularly beneficial in cold weather applications to keep the battery pack within its working temperature range.

Optionally, the caddy includes a lid for sealing the caddy.

Optionally, the phase change material is introduced into the caddy in liquid phase.

Optionally, the phase change material remains in a solid state while the battery pack is under a maximum load.

Optionally, the phase change material melts during a fault condition when temperature of a battery cell exceeds the safe operating temperature.

Optionally, the constant temperature is lower than the safe operating temperature of the battery cells.

Optionally, the phase change material is a molten wax.

Optionally, the soft and malleable pad is a rubber membrane.

Consequently the phase change material used by the present invention equalizes the temperature potentials of every battery cell in the pack, thus improving and extending the performance of the battery pack, and improving the accuracy of the state of charge (SOC) estimations made by a battery management system.

DETAILED DESCRIPTION OF THE EMBODIMENTS

While the invention herein disclosed has been described by means of specific embodiments and applications thereof, numerous modifications and variations could be made thereto by those skilled in the art without departing from the scope of the invention set forth in the claims.

Figure 1:
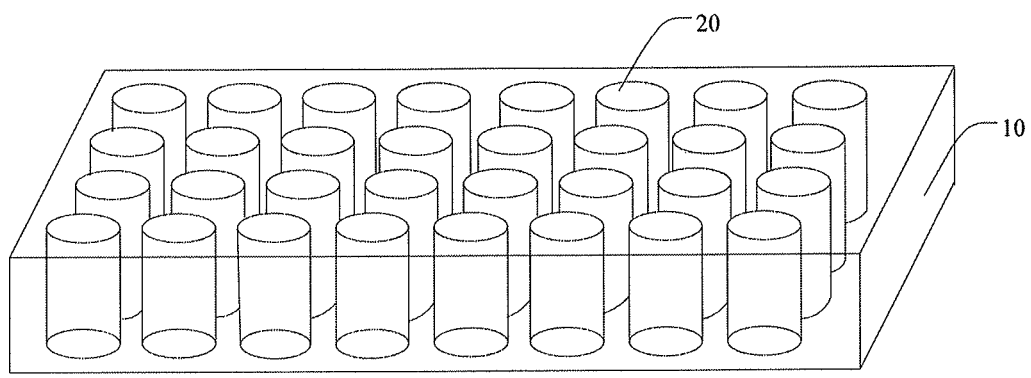
FIG. 1 is a schematic view of an embodiment of a plurality of battery cells retained in a caddy according to the present invention.

FIG. 1 is a schematic view of an embodiment of a plurality of battery cells retained in a caddy according to the present invention. A plurality of battery cells 20 are retained in a caddy 10 for both shipment and assembly.

Figure 2:
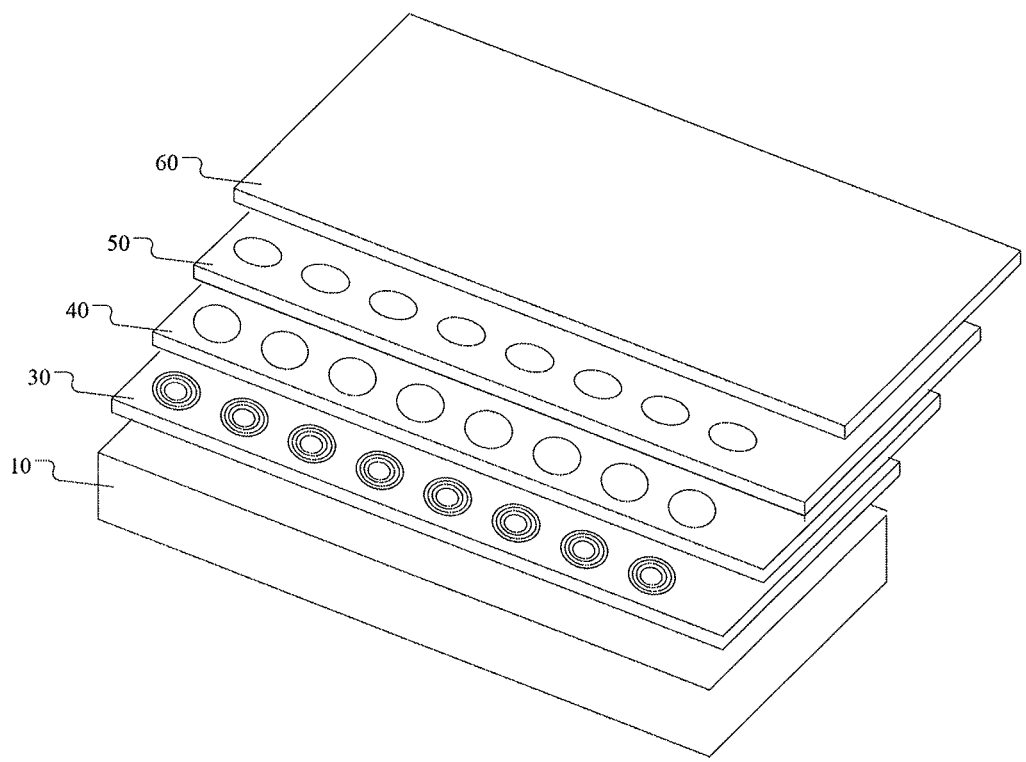
FIG. 2 illustrates a perspective exploded view of a first embodiment of a battery pack assembly according to the present invention.

FIG. 2 illustrates a perspective exploded view of a first embodiment of a battery pack assembly according to the present invention. The battery pack assembly comprises: the caddy 10, the battery cells 20 (not shown in FIG. 2), a soft and malleable pad 30, a plastic cell lattice 40, a Printed Circuit Board 50, a lid 60 and a plurality of ultrasonic wire or ribbon bonds 70. As shown in FIG. 2, the caddy 10 retains the battery cells 20; the soft and malleable pad 30 is set on the top of battery cells 20; the plastic cell lattice 40 is set on the top of the soft and malleable pad 30; the Printed Circuit Board 50 is set on the caddy 10 and on the top of the plastic cell lattice 40; the lid 60 is mounted on the caddy 10 and is adapted for sealing the caddy 10; the plurality of ultrasonic wire or ribbon bonds 70 (shown in FIGS. 6 and 7) directly connects positive contacts and negative contacts of the battery cells with the Printed Circuit Board 50.

Figure 3:
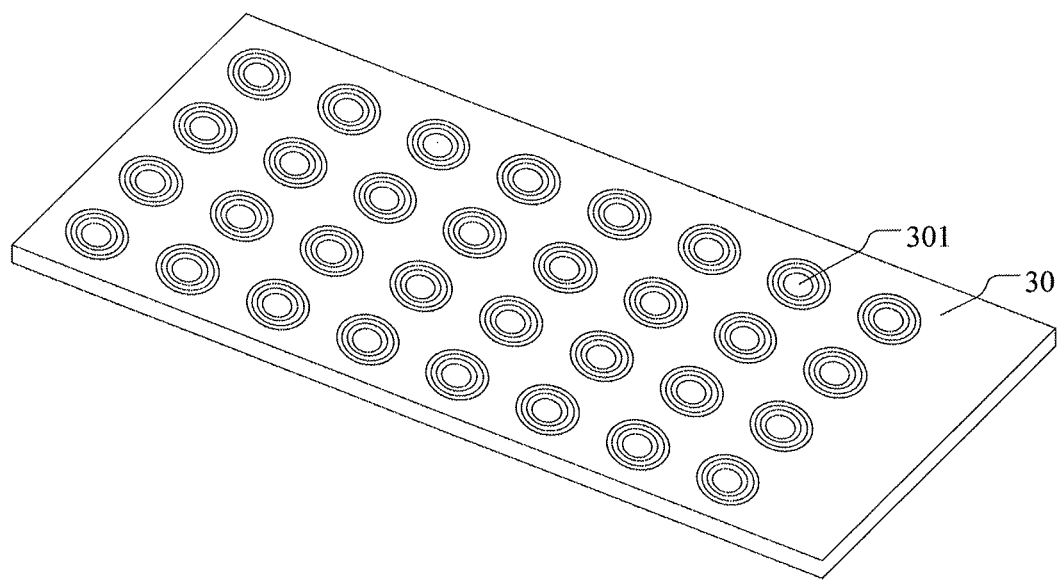
FIG. 3 illustrates a schematic perspective view of a soft and malleable pad of the first embodiment of the battery pack assembly.
Figure 4:
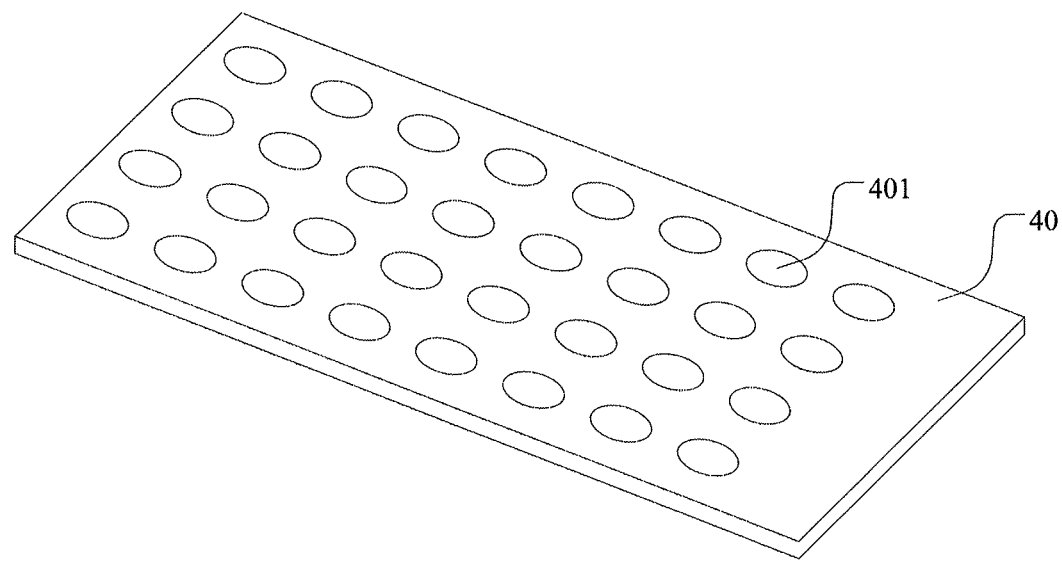
FIG. 4 illustrates a schematic perspective view of a plastic cell lattice of the first embodiment of the battery pack assembly.
Figure 5:
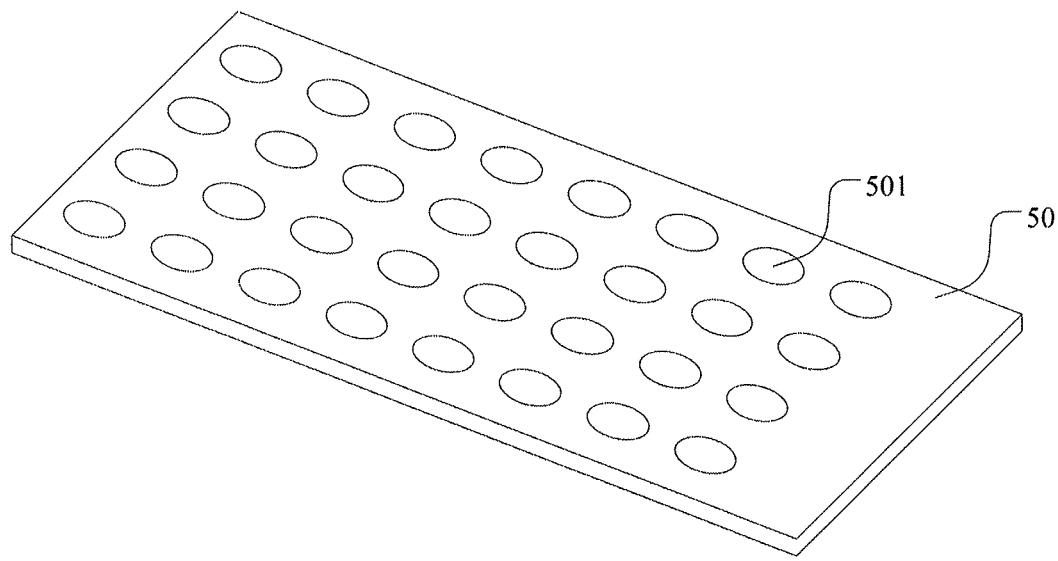
FIG. 5 illustrates a schematic perspective view of a Printed Circuit Board of the first embodiment of the battery pack assembly.

FIG. 3 illustrates a schematic perspective view of a soft and malleable pad of the first embodiment of the battery pack assembly. FIG. 4 illustrates a schematic perspective view of a plastic cell lattice of the first embodiment of the battery pack assembly. Referring to FIG. 5 illustrates a schematic perspective view of a Printed Circuit Board of the first embodiment of the battery pack assembly. Referring to FIG. 3 to FIG. 5, the soft and malleable pad 30 includes a first group of apertures 301, the plastic cell lattice 40 includes a second group of apertures 401, and the Printed Circuit Board includes a third group of apertures 501. The first group of apertures 301, the second group of apertures 401 and the third group of apertures 501 are corresponding to the battery cells, thus leaving the positive contacts and negative contacts of the battery cells approximately in the same vertical plane as the upper surface of the PCB. When juxtaposed with the battery cells 20 contained in the caddy 10 present contact pads aligned both vertically and horizontally in an appropriate manner to enable bonding to the positive and negative contacts of the battery cells 20, wherein the negative contacts is formed by a portion of outer casing of the battery cells.

Figure 6:
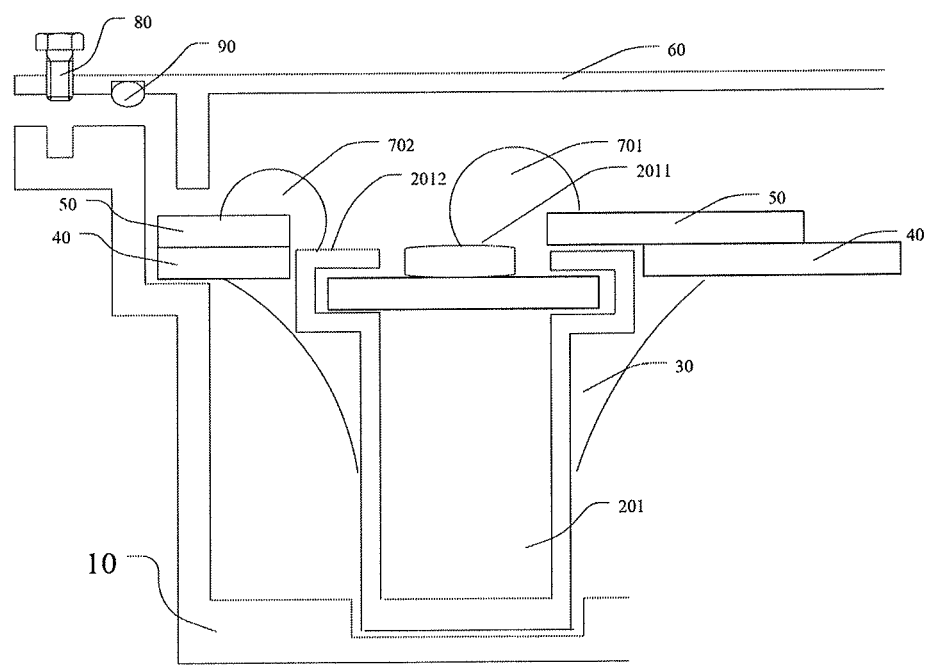
FIG. 6 illustrates a schematic cross section view of the first embodiment of the battery pack assembly according to the present invention.

FIG. 6 illustrates a schematic cross section view of the first embodiment of the battery pack assembly according to the present invention. As shown in FIG. 6, the caddy 10 is featured to support the Printed Circuit Board 50 at an appropriate height in relation to the battery cell 201 to allow for ribbon, wire or other type of ultrasonic bonding.

Figure 7:
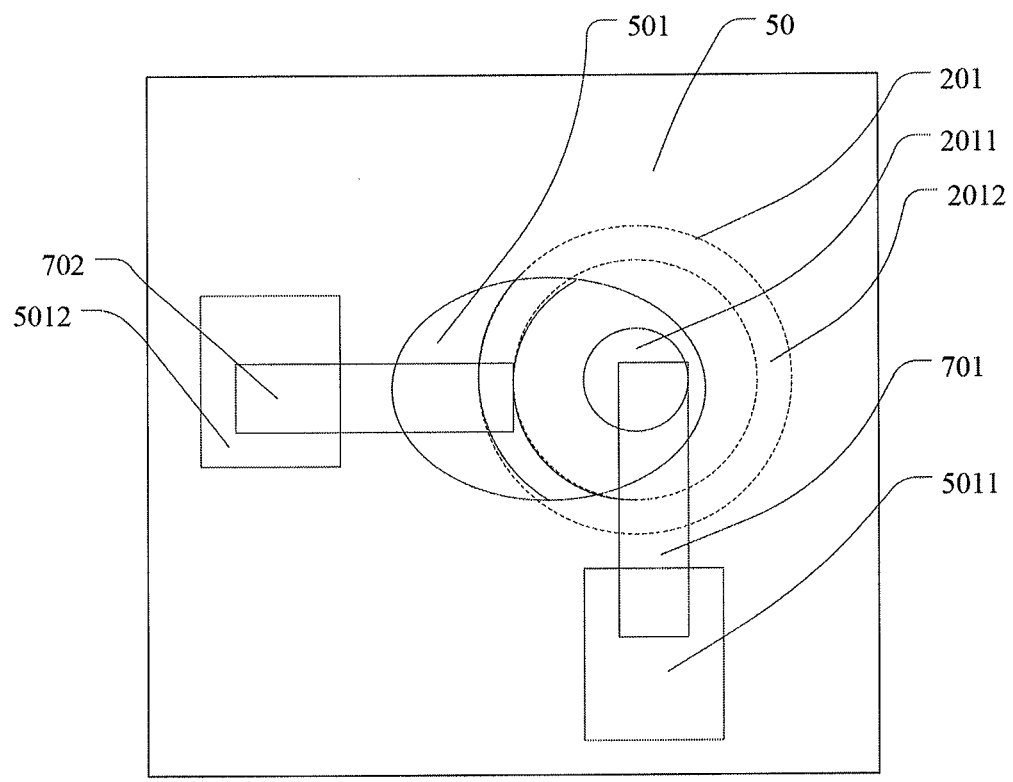
FIG. 7 illustrates a schematic top view of the first embodiment of the battery pack assembly according to the present invention.

FIG. 7 illustrates a schematic top view of the first embodiment of the battery pack assembly according to the present invention. There is only one battery cell 201 in FIGS. 6 and 7, the cross section views and top views of other battery cells are the same with the battery cell 201, and are not shown in the figures. Referring to FIG. 6 and FIG. 7, each battery cell 201 comprises a positive contact 2011 and a negative contact 2012 which is a portion of an outer casing of the battery cell 201. The first group of apertures 301, the second group of apertures 401 and the third group of apertures 501 are corresponding to the battery cells 20 and are appropriately featured to allow an automatic bonding equipment to gain access to the positive contact 2011 and the negative contact 2012 of the battery cell 201. Referring to FIG. 7, there are two PCB pads 5011 and 5012 beside each aperture of the third group of apertures 501. One ultrasonic wire or ribbon bond 701 connects the positive connect 2011 of the battery cell 201 with the PCB pad 5011, and another ultrasonic wire or ribbon bond 702 connects the negative connect 2012 of the battery cell 201 with the PCB pad 5012.

Optionally, the soft and malleable pad 30 is a rubber membrane.

Optionally, the battery pack assembly further comprises a screw 80 and an O-Ring 90 which fix the lid 60 on the caddy 10.

Consequently the battery cells 20 can be connected directly to contact PCB pads on the Printed Circuit Board assembly 50 using an automated method such as ribbon bonding, wire bonding or any similar ultrasonic welding process. This solves a number of issues related to connecting via a traditional wiring harness such as poor reliability, high impedance current paths, vibration resistance and reliance on a maintaining quality of a manually intensive process.

Figure 8:
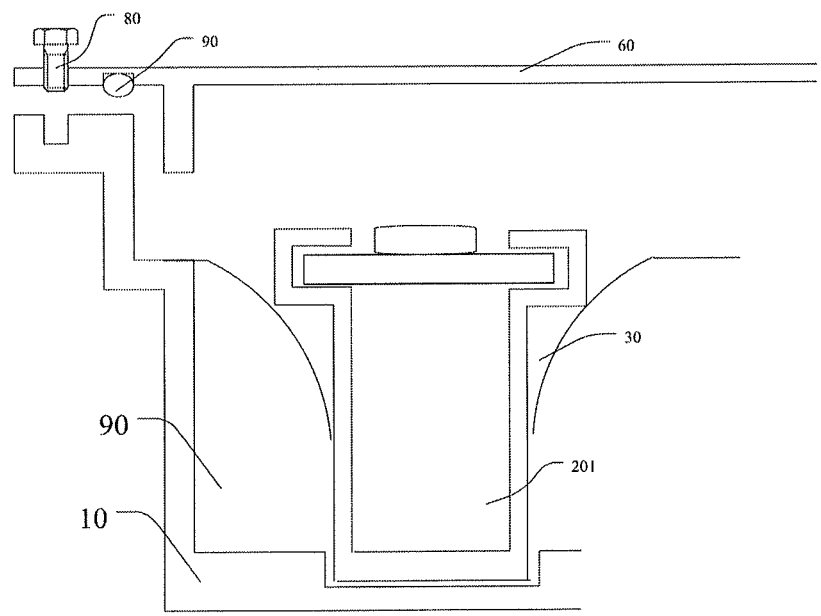
FIG. 8 illustrates a schematic cross section view of a second embodiment of the battery pack assembly according to the present invention.

FIG. 8 illustrates a schematic cross section view of a second embodiment of the battery pack assembly according to the present invention.

As shown in FIG. 1, the battery pack assembly comprises a plurality of battery cells 20 retained in a caddy 10 for both shipment and assembly. Referring to FIG. 8, the battery pack assembly further comprises a phase change material 90, a soft and malleable pad 30 and a lid 60 for sealing the caddy 10. There is only one battery cell 201 in FIG. 8, the cross section views and top views of other battery cells are the same with the battery cell 201, and are not shown in the figures.

FIG. 3 illustrates a schematic perspective view of the soft and malleable pad 30 according to the present invention. Referring to FIG. 3, the soft and malleable pad 30 includes a first group of apertures 301, which are appropriately featured to expose the upper portion of each battery cell. The soft and malleable pad 30 is set on the top of battery cells for compensating for a change in volume as the phase change material 90 changes from solid to liquid phases and vice versa. A hermetically sealed container would experience a change in pressure related to this change in volume and consequently the feature consists of a breathable soft and malleable pad 30. Besides, the soft and malleable pad 30 prevents both the evaporation of the phase change material 90 and also the ingress of moisture and contaminants.

Optionally, the soft and malleable pad 30 is a rubber membrane.

The phase change material 90 keeps the battery cells 20 within a safe operating temperature and equalizing the temperature homogenous across the battery pack. The phase change material 90 is able to absorb significant amounts of latent heat energy at a constant temperature. Besides, by selecting an appropriate melting point in relation to the operating temperature of the battery pack, a degree of thermal management is possible whereby heat energy from the hottest battery cells is circulated by convection to the cooler battery cells. Furthermore, when the temperature reduces in periods of inactivity of the battery cells the phase change material 90 solidifies, thus slowly releasing its stored latent heat back to the battery cells. This is particularly beneficial in colder climates where the application can extend the time that the battery pack is maintained within its working temperature range.

Optionally, the phase change material is introduced into the caddy in liquid phase. This solves a number of issues relating to the pre-forming, machining, milling, molding or otherwise preparing the phase change material 90 in its solid form and reduces the cost and complexity associated with these processes.

Optionally, the phase change material remains in a solid state while the battery pack is under a maximum load.

Optionally, the phase change material melts during a fault condition when temperature of any battery cell exceeds the safe operating temperature.

Optionally, the constant temperature is lower than the safe operating temperature of the battery cells.

Optionally, the phase change material 90 is a molten wax.

Optionally, the battery pack assembly further comprises a screw 80 and an O-Ring 90 which fix the lid 60 on the caddy 10. The caddy 10 is capable of containing the phase change material 90 in its liquid form and is suitably featured to allow the phase change material 90 to be introduced during the manufacturing process.

Consequently the second embodiment of the present invention uses a phase change material to equalize the temperature potentials of every battery cell in the pack, thus improving and extending the performance of the battery pack, and improving the accuracy of the state of charge (SOC) estimations made by a battery management system.

Although the present invention has been disclosed as above with reference to preferred embodiments thereof but will not be limited thereto. Those skilled in the art can modify and vary the embodiments without departing from the spirit and scope of the present invention. Accordingly, the scope of the present invention shall be defined in the appended claims.

What is claimed is:

1. A battery pack assembly allowing automated single ended bonding directly between a battery cell and a Printed Circuit Board, comprising:
    a caddy structured to retain battery cells;
    a soft and malleable pad having a first group of apertures, and being set on the top of battery cells;
    a plastic cell lattice having a second group of apertures, and being set on the top of the soft and malleable pad, wherein the Printed Circuit Board has a third group of apertures, and is set on the top of the plastic cell lattice; and
    a plurality of wires or ribbons having ultrasonic bonding directly connecting positive contacts and negative contacts of the battery cells with the Printed Circuit Board.

2. The battery pack assembly according to claim 1, wherein the caddy has a lid for sealing the caddy.

3. The battery pack assembly according to claim 1, wherein the Printed Circuit Board is mounted on the caddy.

4. The battery pack assembly according to claim 1, wherein the first group of apertures, the second group of apertures, and the third group of apertures correspond to the battery cells, thus leaving positive contacts and negative contacts of the battery cells approximately in a same vertical plane as an upper surface of the Printed Circuit Board.

5. The battery pack assembly according to claim 1, wherein the soft and malleable pad is a rubber membrane.

* * * * *